(12) United States Patent
Graf

(10) Patent No.: US 6,238,522 B1
(45) Date of Patent: May 29, 2001

(54) METHOD AND APPARATUS FOR MEASURING SHEET THICKNESS IN A PAPER-MAKING MACHINE

(75) Inventor: Edwin X. Graf, Menasha, WI (US)

(73) Assignee: Voith Sulzer Paper Technology North America, Inc., Appleton, WI (US)

( * ) Notice: Subject to any disclaimer, the term of this patent is extended or adjusted under 35 U.S.C. 154(b) by 0 days.

(21) Appl. No.: 09/310,874

(22) Filed: May 12, 1999

(51) Int. Cl.[7] .............................. D21G 9/00; D21H 25/04
(52) U.S. Cl. ...................... 162/192; 162/198; 162/262; 162/263; 162/DIG. 10; 250/308
(58) Field of Search .................... 162/50, 192, 262, 162/263, 300, 361, DIG. 10, 198; 250/308, 367; 378/50

(56) References Cited

U.S. PATENT DOCUMENTS

| | | | |
|---|---|---|---|
| 3,881,987 | * | 5/1975 | Benz ................................ 162/116 |
| 4,239,591 | * | 12/1980 | Blake ................................ 162/109 |
| 5,258,622 | * | 11/1993 | Pratt, Jr. ......................... 250/390.05 |
| 5,331,163 | * | 7/1994 | Leahy et al. ..................... 250/367 |

* cited by examiner

Primary Examiner—Dean T. Nguyen
(74) Attorney, Agent, or Firm—Taylor & Aust, P.C.

(57) ABSTRACT

A method and apparatus for measuring thickness of a fiber material during manufacture of the fiber material, especially paper in a paper-making machine, comprises a gamma radiation transceiver in communication with a processing/control system. The gamma radiation transceiver is placed at a points along the production path of the web of paper being produced and liberates gamma radiation towards the fiber material. Backscatter of gamma radiation is received by the gamma transceiver also which generates corresponding signals that are received by the processing/control system. The processing/control system processes the signals to determine a thickness profile along a cross-section of the web. The processing/control system may be in communication with or considered a subset of a main processing/control system for the paper-making machine. A gamma radiation shield may be used with the gamma transceiver and is mounted on the side of the paper web opposite the gamma transceiver. The gamma transceiver preferably includes a cover made from a gamma radiation abating material that is selectively positionable over the gamma radiators. Several gamma transceivers may be positioned along the production path of the web of paper and in communication with the processing/control system in order to provide thickness measurement at various points of the web.

15 Claims, 2 Drawing Sheets

METHOD AND APPARATUS FOR MEASURING SHEET THICKNESS IN A PAPER-MAKING MACHINE

BACKGROUND OF THE INVENTION

1. Field of the Invention

The present invention relates to paper-making machines and, more particularly, to the measurement of web thickness in a paper-making machine.

2. Description of the Related Art

The problems associated with the production of a web of a fiber material such as paper having a consistent thickness (or consistency or height) along the machine-direction (MD) and the cross-direction (CD) thereof, are well known in the art. Various production factors affect web thickness. Most if not all of the various production factors are controllable given relevant and accurate information about the web at a point or points along its production path. Maintaining a consistent profile is essential for the final product.

Also, it is necessary to determine that the web maintains a consistent profile. While there are seemingly many locations to determine the profile of the web, the type of system for making that determination generally dictates where the profiling system must be placed. In some cases more that one position along the web is necessary. It is known to perform weight profiling on the web (paper) in order to determine MD and CD consistency where this information is used to provide some control of the production variables. This category includes visual monitoring of the dry line, and use of ultrasonics at the wet end for determining wet sheet thickness in the MD sense. Devices as described above are generally located under the sensors that obtain MD and CD data for consistency determination at the wet end of a paper-making machine.

What is needed in the art is a wet end or dry end thickness consistency measurement apparatus and/or method.

SUMMARY OF THE INVENTION

The present invention is a method and apparatus for providing thickness measurement of a web of paper in a paper-making machine.

In one form, the present invention is an apparatus for determining the machine-direction (MD) and/or cross-direction (CD) thickness of a web of paper in a paper-making machine, the paper-making machine comprising at least one roll and a wire or felt adapted to support a web of paper. A gamma transceiver comprising a gamma radiation source and gamma radiation detector is positioned adjacent one side of the web of paper. Gamma radiation backscattered by the web of paper is detected and processed to provide a thickness measurement.

The gamma transceiver may be comprised of a plurality of gamma transceiver modules provided in a line or array depending on the desired profile of gamma radiation backscatter. The information may be processed by a processor/controller to determine a thickness profile. Such information may be used to adjust or control front end production parameters.

In another form, several gamma transceivers may be utilized at various points along the paper production path to provide thickness profiling of the paper at various stages of production or within a particular section of the paper-making machine.

In yet another form, the present invention provides a method for determining a thickness of a web of paper in a paper-making machine, the paper-making machine comprising at least one roll and a wire or felt adapted to support a web of paper. The method includes providing a gamma radiator proximate one side of the web and receiving backscattered gamma radiation with a gamma radiation detector. Signals representing the gamma radiation backscattered by the web of paper are processed to provide a thickness measurement.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates a preferred embodiment of the invention, and such exemplification is not to be construed as limiting the scope of the invention in any manner.

DETAILED DESCRIPTION OF THE INVENTION

Figure 1:
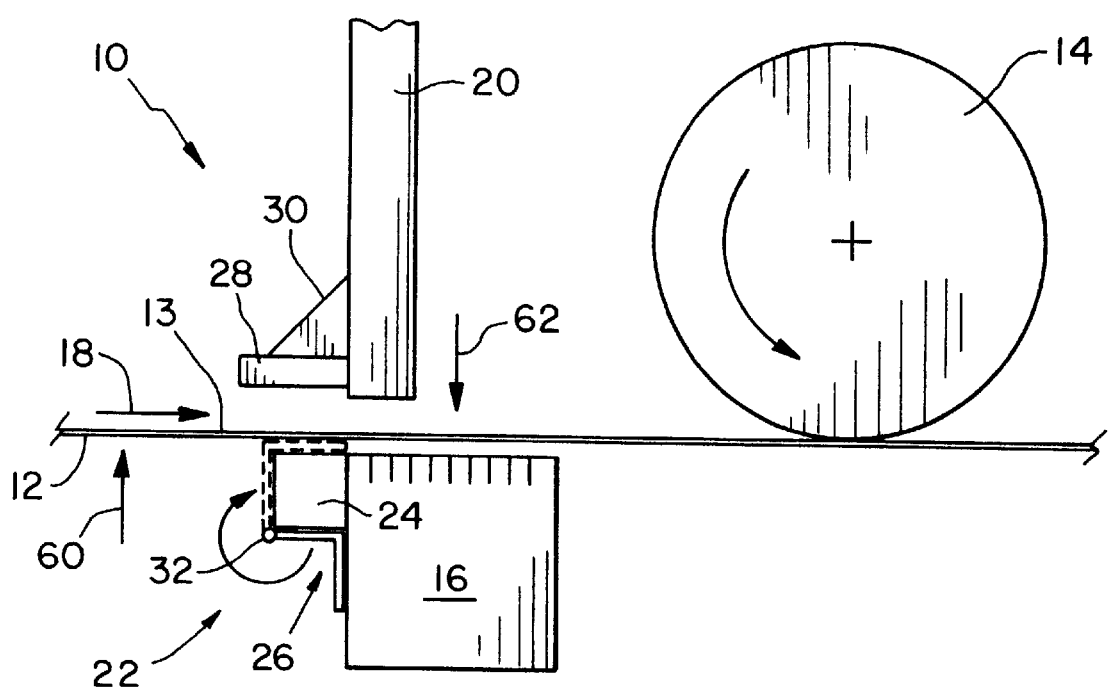
FIG. 1 is an exemplary representation of a forming section of a paper-making machine incorporating an embodiment of the present invention to measure web thickness.

Referring now to the drawings and, more particularly to FIG. 1 there is depicted a representation of forming section 10 of a paper-making machine. It should be understood that forming section 10 is exemplary of any section of a paper-making machine since the present invention is applicable to the many sections that comprise a paper-making machine. Thus, while the present invention will be explained and shown with reference to a forming section, the present invention is not limited for use in a forming section only.

Forming section 10 has wire, felt, or belt 12 that holds or supports web 13 of a fiber material, such as paper, and which allows the movement of web 13 in the direction of arrow 18, also the direction of production, during processing. Roll or cylinder 14, which is one of a plurality of rolls similar in operation and function, in a paper-making machine, helps support and move web 13 along forming section 10 of the paper-making machine. Forming section 10 may include suction box 16 of a type well known in the art that may be one of a plurality of such suction boxes along forming section 10 and the paper-making machine in general. Suction box 16 is adapted to draw moisture from web 13 as web 13 is drawn across the upper area of suction box 16 that is adjacent wire 12.

Mounted to the outside of suction box 16 and preferably adjacent wire 12 is gamma transceiver assembly 22. Gamma transceiver assembly 22 includes housing 24 with cover 26 pivotally attached to housing 24 via hinge 32. Pivotal attachment of cover 26 with housing 24 allows cover 26 to be maintained in several positions; namely, an open position and a closed position with respect to housing 24. Arbitrarily, the open position is defined as that position which allows gamma radiation to emerge from housing 24 and to receive gamma radiation backscatter, while the closed position is defined as that position with respect to housing 24 that prevents gamma radiation emergence and backscatter reception.

Figure 2:
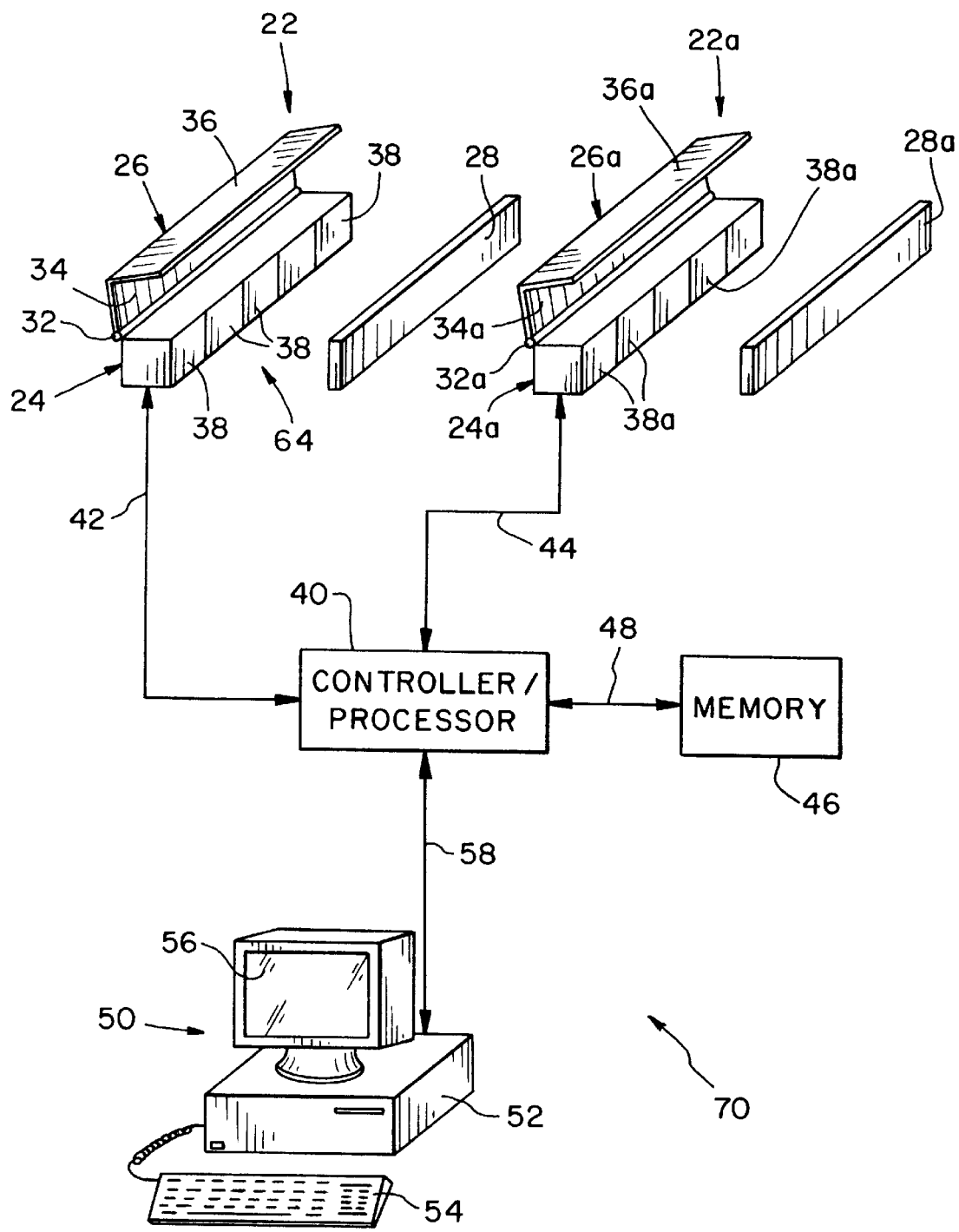
FIG. 2 is a diagrammatic view of two gamma transceivers, each one in communication with a controller/processor system for detecting web thickness in accordance with the principles of the present invention.

With additional reference to FIG. 2, cover 26 includes lower plate 34 that is attached to hinge 32 and upper plate 36 that is attached to lower plate 34 at an essentially right angle thereto. Lower and upper plates 34 and 36 are made of a gamma radiation abating and/or absorbing material such as lead. FIG. 2 depicts cover 26 in an open position such that gamma radiation emitting face 64 of gamma transceiver assembly 22 is not covered or blocked. When cover 26 is in a closed position (dotted lines in FIG. 1), upper plate 36 shields or blocks gamma radiation emitting face 64 while lower plate 24 covers a side of housing 24. In FIG. 2 as just described, gamma transceiver assembly 22 is oriented such that gamma radiation is emitted from emitting face 64 in a direction towards shield 28. In FIG. 1, gamma transceiver assembly 22 is oriented such that gamma radiation is emitted as per arrow 60 since the emitting face thereof faces that direction.

Gamma transceiver assembly 22 includes gamma modules 38 within housing 24 that are adapted to liberate gamma radiation when cover 26 is in the open position, as depicted by the solid line cover in FIG. 1. Gamma radiation is emitted in the direction shown by arrow 60 towards wire 12 and web 13. Gamma radiation backscatter from web material 13 as indicated by arrow 62 is detected by gamma radiation detectors/transducers associated with each gamma module 38 of the gamma transceiver 22. One or many gamma modules 38 may be used per gamma transceiver assembly 22 dependent upon various factors such as web width and desired resolution. When cover 26 is in a closed position as indicated by the dotted lines in FIG. 1, the gamma radiators within gamma modules 38 are blocked or shielded from emission.

Exemplary gamma detectors may be of a semiconductor type (e.g. Si, Ge, CdTe, Hg12, GaAs), or a plastic scintillator type. The gamma detector and any associated circuitry produces signals representative of or correlating to received or detected gamma radiation backscatter. The signals or the gamma modules in general of the gamma transceiver assembly are in communication with processor/controller system 70. Processor/controller system 70 includes controller/processor 40 having memory 46 associated therewith via communication path 48. Gamma transceiver assembly 22 is in communication with controller/processor 40. Signals from gamma transceiver assembly 22 are received by process/controller 40 via cable or communication path 42. Processor/controller 40 may be in communication with memory 46 via cable or communication path 48 for storing gamma backscatter data, and/or PC or other computer or monitor device 50 having for example, processor 52, input device/keyboard 54 and display device 56. Processor/controller system 70 may be a subset of a larger processor/controller system of the paper-making machine, or a standalone component capable of being monitored and/or controlled by the various components of the paper-making machine.

As shown in FIG. 1, preferably associated with gamma transceiver assembly 22 is plate or shield 28 of a gamma radiation absorbing or abating material such as lead. Shield 28 is shown mounted to column or post 20 of forming section 10 with the aid of support rod 30 however, it should be understood that various mounting schemes may be used. Also, while gamma transceiver assembly 22 of FIG. 1 is depicted mounted below wire 12 and web 13 with shield 28 mounted above wire 12 and web 12, it should be understood that gamma transceiver assembly 22 may be mounted above wire 12 and web 13 with shield 28 mounted below wire 12 and web 13.

Sheet thickness is measured in the following manner. Beforehand, it should be understood that thickness measurement of the web may be taken at any point desired along the production path. However, at present, it is deemed advantageous to provide the present gamma transceivers proximate suction boxes within the paper-making machine. To begin the measurement process, cover 26 is maintained in an open position to allow the gamma radiation source(s) of gamma module(s) 38 of housing 24 of gamma transceiver assembly 22 to emit gamma radiation in the general direction as indicated by arrow 60 or towards web 13. Gamma radiation is rapid and nondestructive. Since gamma transceiver assembly 22 preferably includes a plurality of gamma modules 38, each gamma module 38 is in communication with controller/processor 40 via communication path 42. Backscattered gamma radiation from web 13 is received by the gamma detectors of gamma modules 38. The detected information is received, analyzed, and processed by controller/processor 40 having been received thereby from communication path 42. Some data may thereafter be stored in memory 46, or further analyzed or displayed on PC 50.

This data may be used to control a particular parameter associated with a particular machine, production section or step, or the like. For example, measured thickness data may be used for control of a head box discharge or forming section.

In FIG. 2, second gamma transceiver assembly 22a is shown in addition to first gamma transceiver assembly 22. Second gamma transceiver assembly 22a of FIG. 2 comprises the same components as gamma transceiver assembly 22 of FIG. 1, with like parts identified with the same number but additionally having an "a" designation. Like parts of the Figures have at least the same function(s). Information from second gamma transceiver assembly 22a is received by controller/processor 40 via communication path 44. Since gamma transceiver assembly 22a would be placed at another position along the production path, the consistency of the thickness of web 13 may be determined at different locations along the machine.

With one or more gamma transceivers positioned along the production path for the fiber material many functions/results may be achieved for the overall control of the paper-making machine.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. A method of measuring thickness of a fiber web material being produced in a fiber-making machine, the fiber-making machine having at least one roll, and a support adapted to bear a fiber material web, comprising the steps of:

providing a gamma radiation source adjacent one side of the support proximate the fiber material web;

providing a gamma radiation receiver adjacent the one side of the support, the gamma radiation receiver adapted to receive backscatter gamma radiation from the fiber material web;

producing signals corresponding to the backscatter gamma radiation received by the gamma radiation receiver;

providing the signals corresponding to the backscatter gamma radiation received by the gamma radiation receiver to a processor in communication therewith;

utilizing the processor to determine a thickness profile of the fiber material web; and providing a cover of a gamma radiation suppressing material that is selectively positionable to quell gamma radiation emanating from the gamma radiation source, said cover being mounted to said housing by a hinge, said cover being selectively positionable by pivoting said cover about said hinge.

2. The method of claim 1, wherein the gamma radiation receiver is positioned along a cross-direction of the fiber material web, and said processor determines a cross-direction thickness profile of the fiber material web.

3. The method of claim 1, further comprising the steps of:

providing a second gamma radiation source adjacent one side of the support proximate the fiber material web and distal from the first gamma radiation source;

providing a second gamma radiation receiver adjacent the one side of the support proximate the second gamma radiation source, the second gamma radiation receiver adapted to receive backscatter gamma radiation from the fiber material web, and in communication with the processor;

producing second signals corresponding to the backscatter gamma radiation received by the second gamma radiation receiver;

providing the second signals corresponding to the backscatter gamma radiation received by the second gamma radiation receiver to the processor; and determining by the processor cross-direction and machine-direction thickness profiles for the fiber material web.

4. A method of measuring thickness of a fiber web material being produced in a fiber-making machine, the fiber-making machine having at least one roll, and a support adapted to bear a fiber material web, comprising the steps of:

providing a gamma radiation source adjacent one side of the support proximate the fiber material web;

providing a gamma radiation receiver adjacent the one side of the support, the gamma radiation receiver adapted to receive backscatter gamma radiation from the fiber material web;

producing signals corresponding to the backscatter gamma radiation received by the gamma radiation receiver;

providing the signals corresponding to the backscatter gamma radiation received by the gamma radiation receiver to a processor in communication therewith;

utilizing the processor to determine a thickness profile of the fiber material web; and providing a shield having gamma radiation absorbing properties on a side of said support opposite the gamma radiation source.

5. A paper-making machine, comprising:

a roll;

a traveling web support disposed adjacent said roll and adapted to support a paper web;

a gamma radiator disposed adjacent a surface of said web support and adapted to radiate gamma radiation toward the paper web;

a gamma backscatter receiver disposed adjacent a side of said web support and adapted to receive gamma radiation backscatter from the paper web and produce signals corresponding to received backscatter gamma radiation, said gamma receiver and said gamma radiator being disposed in a housing having a gamma radiation abating cover that is selectively positionable to quell gamma radiation emanating from said gamma radiator, said cover being mounted to said housing by a hinge, said cover being selectively positionable by pivoting said cover about said hinge; and a processor in communication with said gamma backscatter receiver and adapted to utilize said signals to determine a thickness profile of the paper web.

6. The paper-making machine of claim 5, wherein said gamma backscatter receiver comprises a plurality of gamma radiation transducers distributed along a cross-direction of the paper web, and said thickness profile is a cross-direction thickness profile.

7. The paper-making machine of claim 5, wherein said gamma radiator and said gamma backscatter radiator are positioned proximate a suction box of the paper-making machine.

8. The paper-making machine of claim 5, further comprising a shield having gamma radiation absorbing properties and disposed on a side of said web support opposite said gamma radiator.

9. A paper-making machine, comprising:

at least one roll;

a traveling support disposed adjacent said roll and adapted to bear a paper web;

a gamma radiation transceiver mounted proximate one side of said support, said gamma radiation transceiver adapted to radiate gamma radiation toward said paper web, to receive gamma radiation backscatter from said paper web as a result of radiated gamma radiation, and to generate signals corresponding to said gamma radiation backscatter; and a processor in communication with said gamma radiation transceiver and adapted to receive said signals from said gamma radiation transceiver, said processor determining a thickness of said paper web.

10. The paper-making machine of claim 9, wherein said thickness of said paper web is a cross-directional thickness.

11. The paper-making machine of claim 9, wherein said gamma radiation transceiver comprises a plurality of gamma radiation transducers adapted to receive the gamma radiation backscatter from said paper web, said gamma radiation transducers distributed along a cross-direction of said paper web relative to paper web movement.

12. The paper-making machine of claim 11, wherein said gamma radiation receiver includes a housing having a gamma radiation suppressing cover that is positionable to suppress gamma radiation emanating from said gamma radiation transceiver, said cover being mounted to said housing by a hinge, said cover being selectively positionable by pivoting said cover about said hinge.

13. The paper-making machine of claim 9, further comprising a shield having gamma radiation absorbing properties and disposed on a side of said support opposite said gamma radiation transceiver.

14. The paper-making machine of claim 9, wherein said gamma radiation transceiver is positioned proximate a suction box of a forming section of the paper-making machine.

15. The paper-making machine of claim 9, further comprising:

a second gamma radiation transceiver adapted to radiate gamma radiation toward said paper web, to receive gamma radiation backscatter from said paper web as a result of radiated gamma radiation, and to generate second signals corresponding to said gamma radiation backscatter, said second gamma radiation transceiver in communication with said processor;

said processor adapted to receive said second signals from said second gamma radiation transceiver and to determine cross-direction and machine-direction thickness profiles of the paper web in conjunction with said signals from said gamma radiation transceiver.

* * * * *